Aug. 14, 1945.　　　H. O. MÜLLER　　　2,382,739
APPARATUS FOR TAKING PICTURES OF THE IMAGES
PRODUCED BY THE ELECTRON OPTIC APPARATUS
Filed Jan. 28, 1941

INVENTOR
HEINZ OTTO MULLER

BY

ATTORNEY.

Patented Aug. 14, 1945

2,382,739

UNITED STATES PATENT OFFICE 2,382,739

APPARATUS FOR TAKING PICTURES OF THE IMAGES PRODUCED BY ELECTRON OPTIC APPARATUS

Heinz Otto Müller, Berlin-Spandau, Germany; vested in the Alien Property Custodian Application January 28, 1941, Serial No. 376,310
In Germany October 17, 1939

3 Claims. (Cl. 250—65)

This invention relates to electron optical apparatus in which a beam of electron rays is caused to produce photographic images.

In such apparatus, particularly in electronic microscopes, devices are necessary for observing the image on a fluorescent screen and then exposing a photographic plate to the electron rays. It is known to provide a fluorescent screen which may be removed from the path of rays by rotation. When turned into the path of the beam, the screen shows the image to be photographed and at the same time covers the photographic plate. By turning the screen out of the beam path, the photographic plate is exposed until the screen is moved back into its original position. This method has the disadvantage that the photographic plate is not uniformly exposed to the electron beam. The parts of the photographic plate which lie nearer the pivot of the screen are exposed for a shorter time as compared with the other areas of the plate. Furthermore, it is not possible to adjust the exposure time with sufficient accuracy, since the shutter is hand-operated. This is particularly disadvantageous when employing highly sensitive plates which require a short exposure time of accurate duration and uniform effect. Furthermore, when effecting the response directly by moving the fluorescent screen away from the beam path, vibrations are apt to occur so that the sharpness of the image may easily be impaired.

It is an object of the invention to illuminate the above-mentioned drawbacks of the known electron-optical apparatus and to provide means for exposing a photographic plate or the like to an image-producing electron beam while obtaining a uniform exposure of adjustable duration which is not affected by the movement of the fluorescent screen necessary for observing and focusing the image preparatory to the exposure.

According to the invention a separate shutter is arranged within the vacuum vessel in the path of the electron beam between the screen and the photographic means. This shutter is of the adjustable type to permit selecting the exposure time. The actuating means for setting the shutter extend through the vacuum wall of the electronic vessel and are operable from the outside. In this manner it is possible to uniformly expose the entire surface of the photographic plate to the electron rays for an accurately adjusted period. This permits using highly sensitive plates with the additional advantage that the sharpness of the image is improved owing to the shorter exposure time. In the apparatus according to the invention, a focal plane shutter or a central metal shutter may be used. In order to release the shutter, a mechanism is employed to advantage which is actuated with the aid of the fluorescent screen. The releasing device is, for instance, so controlled by the fluorescent screen that the release is effected automatically after the screen has been moved away from the beam path.

The accompanying drawing illustrates two embodiments of the invention in diagrammatic form:

Figure 3:
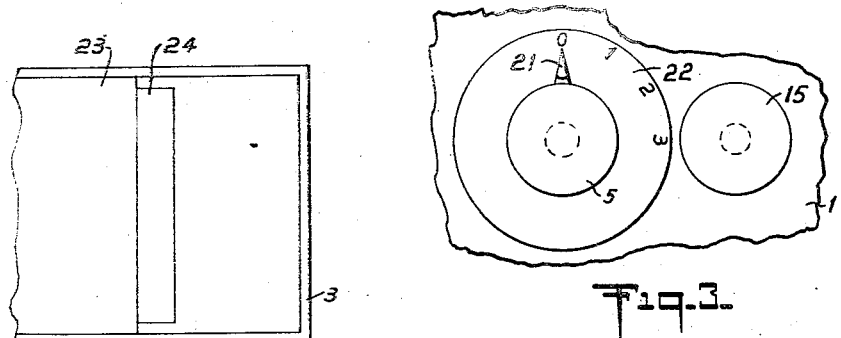
Fig. 3 is a front view of the control knobs of the shutter.
Figure 1:
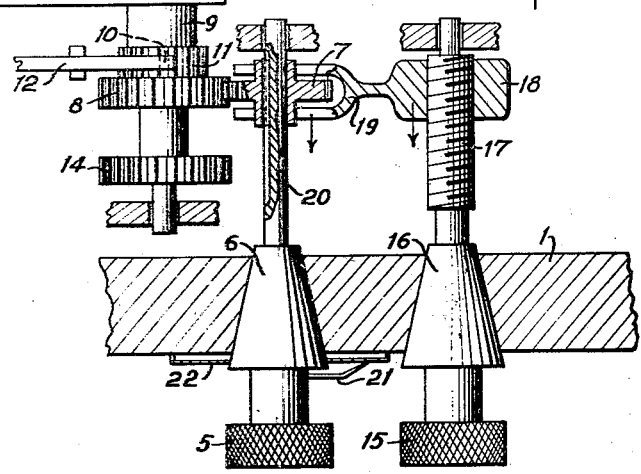
Fig. 1 is a top view of a focal plane shutter and its actuating means.

Referring to the drawing, 1 denotes the vacuum wall of an electronic microscope, 2 is a photographic plate, 3 a focal plane shutter and 4 a fluorescent screen on which the image produced in the microscope may be viewed before taking a picture thereof. The focal plane shutter is of the type well known in photography. It contains a roller blind 23 provided with a slot 24. When in operation, the blind moves along the plate so that the slot and the area uncovered thereby travel across the plate surface. The movement is effected by means of a spring (not shown). To wind up the spring, a knob 5 is employed whose axis passes through the vacuum wall 1 with the aid of a sealing cone 6. The rotation of knob 5 is transmitted to the shaft 9 of the slit shutter through the gears 7 and 8. To prevent the shutter from operating after its spring has been wound up, a pawl 10 is employed which cooperates with a ratchet wheel 11.

Figure 2:
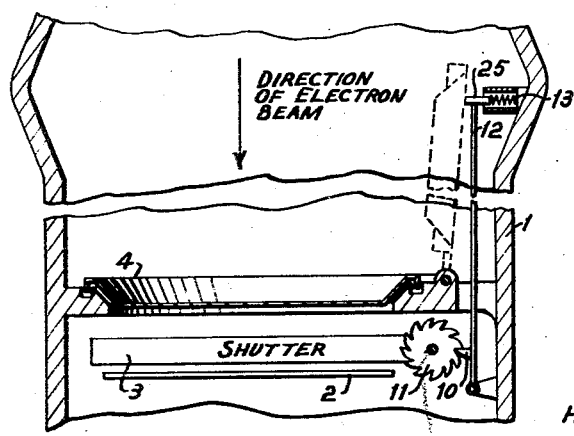
Fig. 2 is an axial section through an electronic microscope containing the shutter.

The release of the shutter is effected by means of the fluorescent screen 4 which may be rotated by means of a sealing cone not shown in Fig. 2 which is operated exteriorly of the vacuum vessel. In the end position shown in broken lines, the screen 4 presses against a stop 25 mounted on a lever 12 to which is secured the pawl 10. A spring 13 pressing against the lever 12 holds the pawl 10 against the ratchet wheel 11 when winding up the shutter mechanism. When the screen 4 engages the stop 25 and displaces it against the action of the spring 13, the pawl 10 is moved out of engagement with the ratchet wheel 11 and releases the shutter mechanism, thereby effecting an exposure of the photographic plate.

The exposure speed of a focal plane shutter depends on the width of the shutter slot and on the speed with which the slot moves across the plate surface. Hence, the effective exposure time can be varied by varying either the width of the slot or the running speed of the shutter. For instance, it is customary to provide a stop which limits the winding-up of the driving spring. By displacing the stop, the tension of the spring and therewith the running speed of the shutter can be adjusted.

In the illustrated embodiment, while the gear wheel 8 serves to wind up the shutter, a second gear wheel 14, independently rotatable about the same shaft 9, is employed for adjusting the shutter speed, for instance in the last-mentioned manner. For adjusting the exposure time, the gear 7 is brought into engagement with the gear 14. The displacement of the gear 7 is effected with the aid of a knob 15 which drives a screw shaft 17 carrying a screw nut 18. The latter when actuated moves a forked lever 19 in the downward direction as indicated by an arrow, so that the gear 7, slidably mounted on the shaft 20 moves also in the same direction until it meshes with the gear 14. In this position the exposure time may be adjusted by rotating the knob 5. To facilitate the adjustment of the exposure time, a pointer 21 and a scale 22 are provided as illustrated in Fig. 3.

Focal plane shutters which are provided with a single means for both winding up the shutter spring and adjusting the exposure time are well known and an illustrative example is shown in the patent to Küppenbender, No. 2,090,390, patented August 17, 1937.

As mentioned above, the release is effected with the aid of the fluorescent screen 4 within the vacuum device for the reception of the photographic material. Such a release, in contrast to the known devices, prevents an uneven exposure of the photographic plate as is the case when the screen itself forms the shutter. Furthermore, the invention reduces the effect of vibrations, since the release of the shutter occurs only after the screen has passed through the first portion or most of its opening movement and requires no manual operation through sealing cones or other devices apt to cause vibrations of the vessel wall.

The apparatus according to the invention may be employed in electronic microscopes, mass spectrographs or the like electronic apparatus.

What is claimed is:

1. An electron-optical device for causing an electron beam to produce photographic images, comprising a vacuum vessel, a photographic means for receiving the image, a fluorescent screen arranged in said vessel in front of said photographic means relative to the direction of the electron beam, said screen being movable to permit being placed in the path of the beam for observing the image previous to the photographic exposure and to be removed from said path preparatory to the exposure, a focal plane shutter arranged between said screen and said photographic means and having spring winding means operable exteriorly of said vacuum vessel, and a releasing mechanism controlled by said screen upon removal thereof from the electron beam path for releasing said shutter so as to effect the exposure of said photographic means.

2. An electron-optical device for causing an electron beam to produce photographic images, comprising a vacuum vessel, a photographic means for receiving the image, a fluorescent screen arranged in said vessel in front of said photographic means relative to the direction of the electron beam, said screen being movable to permit being placed in the path of the beam for observing the image previous to the photographic exposure and to be removed from said path preparatory to the exposure, a focal plane shutter arranged between said screen and said photographic means, said shutter having spring winding means operable exteriorly of said vacuum vessel and a mechanism for releasing said spring winding means, and a stop arranged in the path of movement of said screen and connected with said mechanism so as to effect a release when said screen reaches its inoperative position.

3. An electron-optical device for causing an electron beam to produce photographic images, comprising a vacuum vessel, a photographic means for receiving the image, a fluorescent screen arranged in said vessel in front of said photographic means relative to the direction of the electron beam, said screen being rotatable about an axis parallel to the focal plane of said photographic means to permit being placed in the path of the beam for observing the image previous to the photographic exposure and to be turned away from said path preparatory to the exposure, a focal plane shutter arranged between said screen and said photographic means, said shutter having spring winding means operable exteriorly of said vessel, a control mechanism for releasing said spring winding means, and a stop disposed so as to limit the movement of said screen when the latter is turned away from said beam path, said stop being connected with said control mechanism to actuate the latter when engaged by said screen.

HEINZ OTTO MÜLLER.